Oct. 6, 1970  LARS-GÖRAN VIRSBERG  3,532,804
MEANS IN ELECTRIC INSULATORS FOR KEEPING THE UPPER SIDE
OF THE INSULATOR PLATE FREE FROM DEPOSITS REDUCING
THE FLASHOVER STRENGTH
Filed March 27, 1969
2 Sheets-Sheet 1
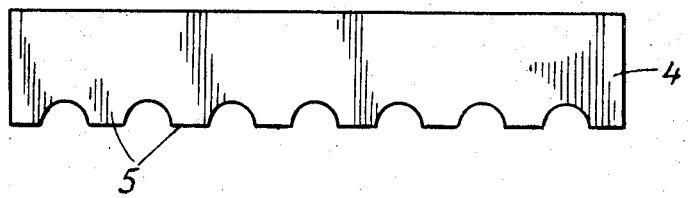
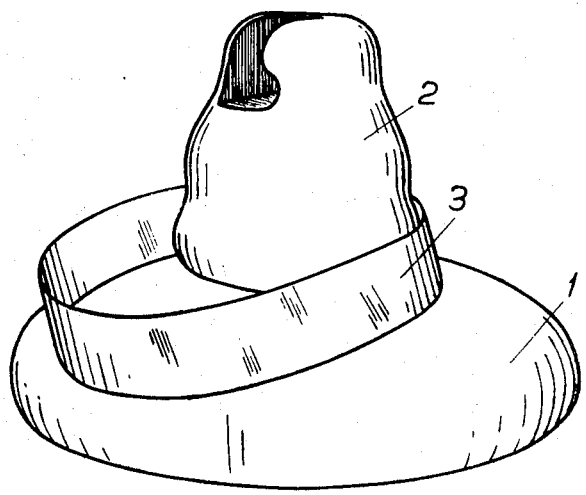
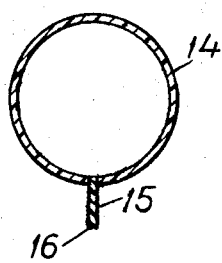
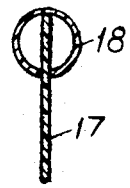
INVENTOR.
LARS-GÖRAN VIRSBERG
BY

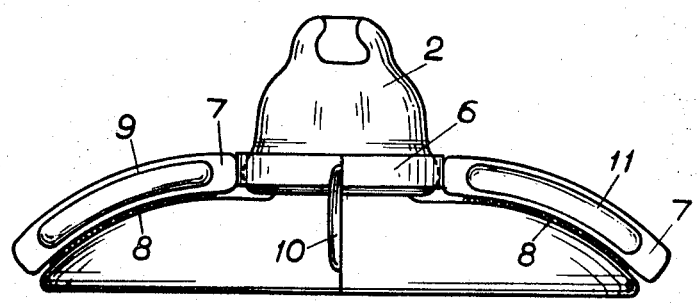
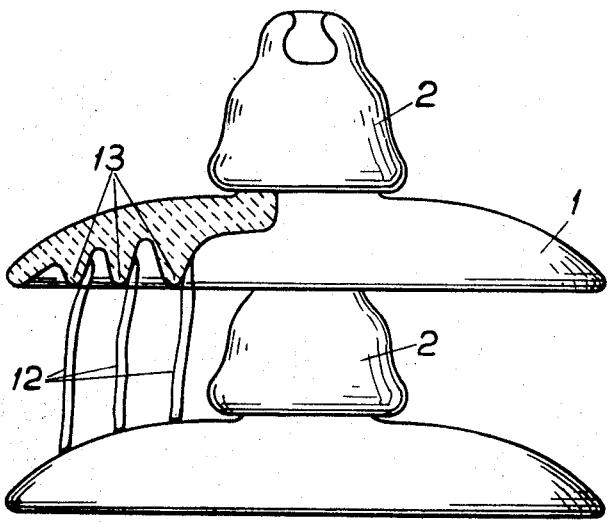
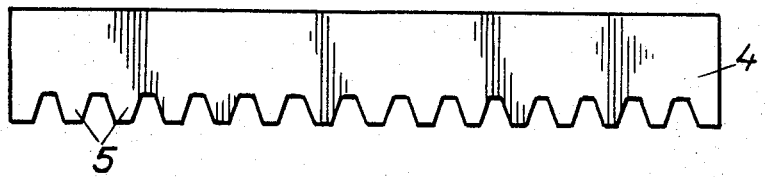

United States Patent Office 3,532,804
Patented Oct. 6, 1970

3,532,804
MEANS IN ELECTRIC INSULATORS FOR KEEPING THE UPPER SIDE OF THE INSULATOR PLATE FREE FROM DEPOSITS REDUCING THE FLASH-OVER STRENGTH
Lars-Göran Virsberg, Vasteras, Sweden, assignor to Allmanna Svenska Elektriska Aktiebolaget, Vasteras, Sweden, a corporation of Sweden
Filed Mar. 27, 1969, Ser. No. 810,988
Int. Cl. H01b *17/52*
U.S. Cl. 174—139           7 Claims

ABSTRACT OF THE DISCLOSURE

In order to keep the upper side of an electrical insulator plate free of deposits which reduce the flash-over strength, one or more easily movable elements such as a flexible ring of electrically insulating material are arranged above the upper side of the plate, the element being capable of being kept in movement by the wind and being at least periodically in movable contact with the upper side of the insulator plate.

BACKGROUND OF THE INVENTION (1) Field of the invention

The invention relates to an arrangement for keeping the upper side of an electrical insulator plate free of deposits.

When dimensioning electrical insulators for outdoor use, considerable care must be taken regarding dirt on the insulator surface which is relatively quickly deposited in the vicinity of certain industries or the salt deposit occurring in coastal districts. The problem of flashover is particularly serious in damp weather and is further accentuated on insulators in DC transmission lines. Several ways of overcoming the problem have been tried, for example by shaping the insulator differently, by coating it with silicon fat, by rinsing it with water, etc.

SUMMARY OF THE INVENTION

The present invention relates to an entirely new solution of the problem. The invention relates to a means in electric insulators for keeping the upper side of the insulator plate free from deposits reducing the flashover strength. The invention is characterised in that one or more easily movable elements of electrically insulating material are arranged above the upper side of the insulator plate in such a way that they are kept in movement by the wind and thus are continuously or intermittently in movable contact with the upper side of the insulator plate.

BRIEF DESCRIPTION OF THE DRAWINGS

In the accompanying drawings FIG. 1 shows a perspective view of an insulator element which is provided with an element according to the invention. FIG. 2 shows another embodiment of the movable element, which is here made as a wind wheel. A third embodiment is shown in FIG. 3 and FIGS. 4 and 5 show that the edge of the movable element in contact with the insulator surface is toothed. FIGS. 6 and 7 show cross-sections through two embodiments of the movable element.

DESCRIPTION OF THE PREFERRED EMBODIMENTS

FIG. 1 shows a perspective view of an insulator element of cap-pin type for suspension insulators. The insulator plate is designated 1 and the cap 2. Around the cap is a ring 3 of insulating material. The ring consists of a strip of a foil of thermo-plastic or elastomer standing on edge. As examples of such material may be mentioned polytetrafluoroethylene which is known under the trademark Teflon, polyethylene glycol terephthalate, known under the trademark Mylar, polycarbonates, polyamides, silicon rubber, etc. It is also feasible to use hard resins, glass-fibre reinforced plastic with unsaturated ester resins as binder and paper laminates with phenolic resins as binder.

Since the ring is manufactured from thin material and has a relatively large surface, it will be influenced even by light winds so that it starts moving with its lower edge in contact with the insulator surface at at least one point and thus crosses the surface like a scraper so that it effectively removes all deposits on the insulator surface. The length of the tape is adapted so that the insulator plate is cleaned right out to the edge.

FIGS. 4 and 5 show that the strip 4 of which the ring is formed, is provided with teeth 5 contacting the insulator. In this way dirt which may collect at the lower edge of the ring is prevented from forming a line which may be more or less conducting and which may facilitate the occurrence of flashover or creepage current along the surface. If the tape is toothed in some way there is a break in such a line in the gaps between the teeth.

FIG. 2 shows another embodiment of the movable element. Around the cap 2 is a ring 6, the diameter of which is greater than the greatest diameter of the cap so that the ring can easily rotate. On the outside of the ring is a number of wings 7 which are thin and standing on edge. The under edge 8 of the wings has a profile which substantially agrees with the profile of the upper side of the insulator plate. Possibly, this lower edge may be toothed as described in connection with FIG. 4. The material in the wings is bent out at one side so that the wing 7 has a concave surface 9 which is pressed down in relation to the plane of the figure. The wing in the centre of the figure shows this surface 9 as a dent 10 directed to the left. The right wing in the figure has a convex surface 11 which is situated outside the plane of the figure. An element designed in this way acts as a wind wheel which will rotate above the insulator surface and scrape away deposits on this.

FIGURE 3 shows another solution of the problem. The easily movable elements consist here of strips 12 of plastic material which are suspended on the lower side by an insulator element, for example by glueing them onto the flanges 13. The length of the strips is such that the free end reaches down to the surface on the insulator element situated below. When the wind blows the strips will flap and the free ends will brush the insulator surface clean.

FIGS. 6 and 7 show cross sections through two other embodiments of the element freely movable on the insulator surface. According to FIG. 6 a narrow tape 15 is attached to a thin-walled tube 14 of insulating material, the lower edge 16 of the tape touching the insulator. In the embodiment according to FIG. 7 a flat tape 17 is used of the same type as the ring 3 in FIG. 1. A tube 18 of insulating material is split along a generatrix and placed so that it surrounds the upper edge of the tape 17. The tube 18 may be glued to the tape 17. Both these embodiments may have advantages if the dirt comes from substances which are good electrical conductors. If the tape becomes heavily coated there may be a risk of discharge at the free, upper edge in the embodiment shown in FIG. 1.

The embodiments of the easily movable element described should only be regarded as a few of all feasible solutions of the problem of keeping the insulator surface clean from damaging deposits. The invention is of course also useful for other types of insulators.

What is claimed is:

1. In combination with an electric insulator comprising an insulator plate havving a slightly convex symmetrical upper surface and a cap situated upon said plate, means to keep the upper surface of said plate free from deposits reducing the flash-over strength, said means comprising at least one easily movable element of electrically insulating material arranged above the upper surface of the plate, said element being capable of being kept in movement by the wind and being at least periodically in movable contact with the upper surface of the isulator plate to remove dirt therefrom.

2. In a device according to claim 1, the movable element comprising a ring formed of a strip of electrically insulating material arranged on edge, resting on said upper surface and surrounding said cap.

3. In a device according to claim 1, the movable element comprising a wind wheel having wings attached to a ring which is freely movable around said cap, the lower edge of each wing having a contour substantially corresponding to the upper surface of the plate.

4. In a device according to claim 1, having an insulator member above said plate having a lower side, the means comprising a plurality of strips of insulating material attached to the lower side of said insulator member, said strips being so long that their lower ends reach the upper surface of said plate.

5. In a device according to claim 1, the movable element comprising a ring formed of a strip of electrically insulating material arranged on edge and surrounding said cap, the edge of the strip resting on the upper surface being toothed.

6. In a device according to claim 1, the movable element comprising a tube and a tape attached to the tube, the tape extending radially out from the tube and contacting the upper surface of the plate.

7. Means according to claim 1, in which the movable element comprises a ring formed of a strip of electrically insulating material arranged on edge and surrounding the cap, and having an upper edge, a slotted tube of insulating material engaged over the free upper edge of the ring, said upper edge of the ring being engaged in the slot.

References Cited

UNITED STATES PATENTS 201,615    3/1878    Johnson et al.
2,946,841    7/1960    Wagner _____ 174—139

FOREIGN PATENTS 244,981    12/1925    Great Britain.

LARAMIE E. ASKIN, Primary Examiner

U.S. Cl. X.R.

174—211